INVENTORS
Irving M. Levy
James E. Whelan
BY C. R. Meland
THEIR ATTORNEY

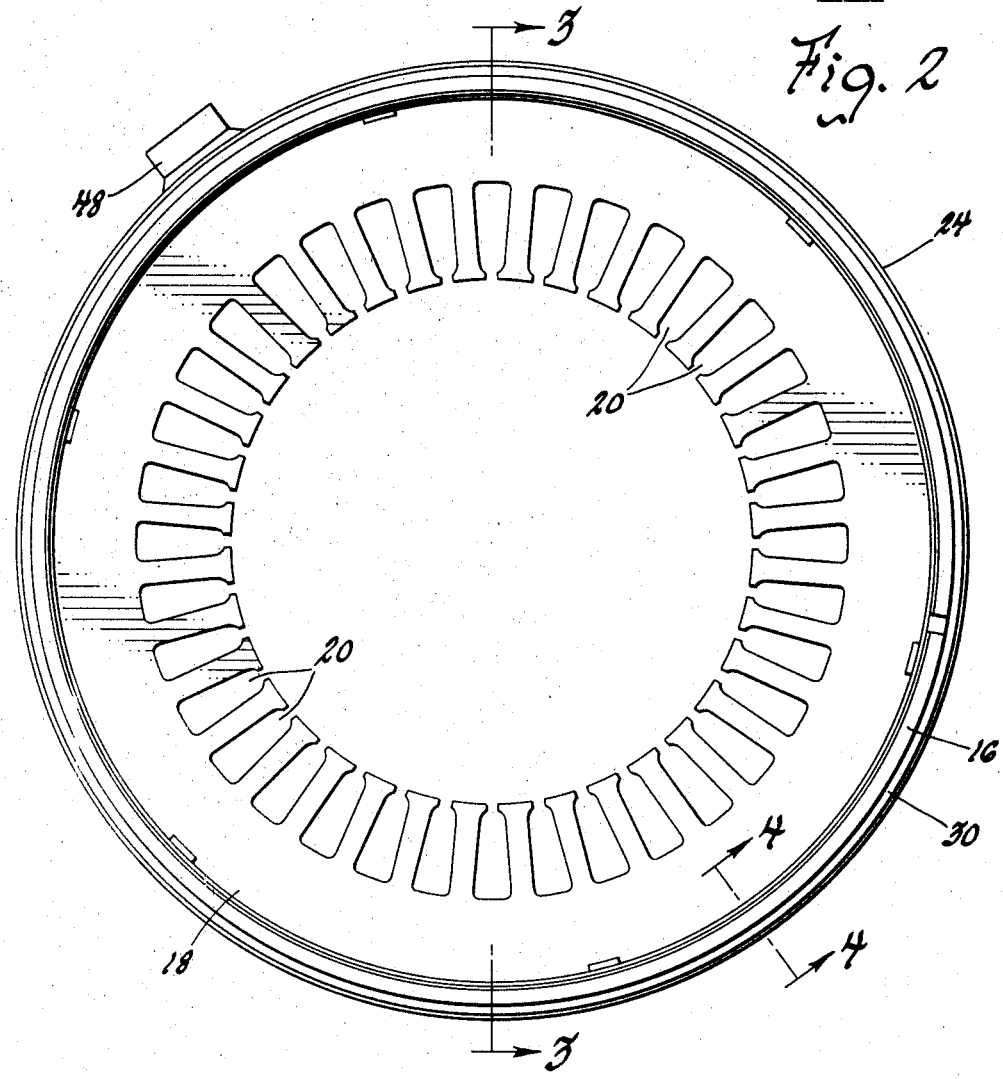
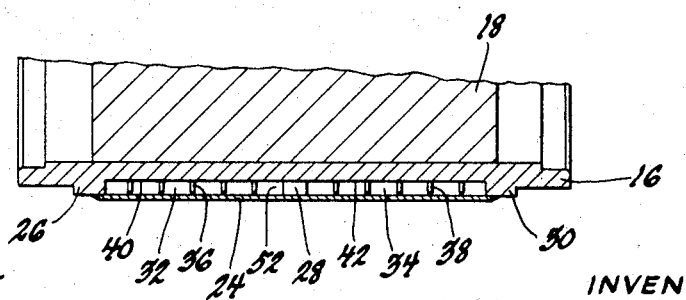

INVENTORS
Irving M. Levy
James E. Whelan
BY
C. R. Meland
THEIR ATTORNEY

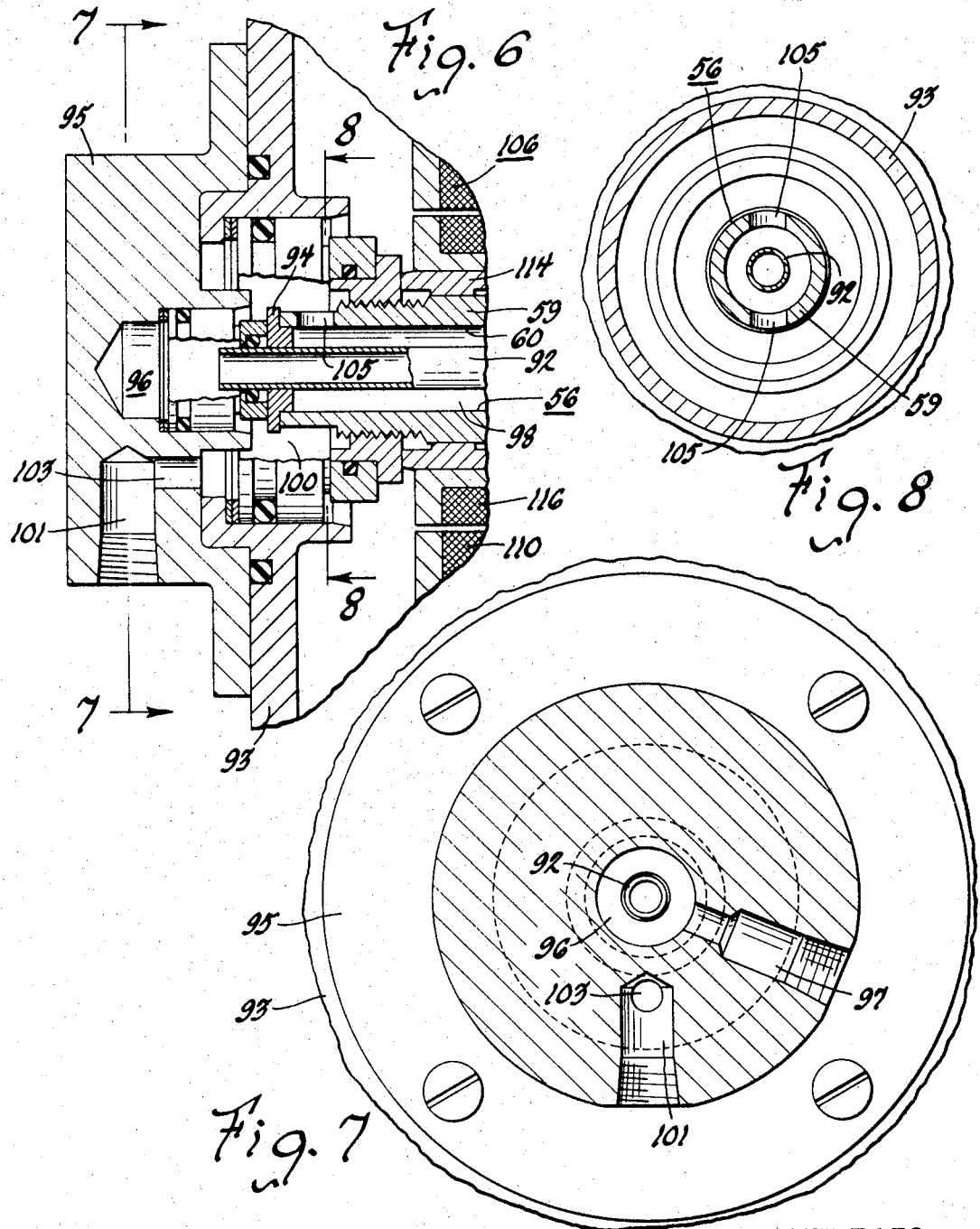

United States Patent Office 3,439,201
Patented Apr. 15, 1969

3,439,201
COOLING ARRANGEMENT FOR DYNAMOELECTRIC MACHINES
Irving M. Levy and James E. Whelan, Dayton, Ohio, assignors to General Motors Corporation, Detroit, Mich., a corporation of Delaware
Filed Oct. 6, 1965, Ser. No. 493,436
Int. Cl. H02k 9/19
U.S. Cl. 310—52         9 Claims

ABSTRACT OF THE DISCLOSURE

This invention relates to cooling arrangements for cooling the rotor and the stator of an induction motor. The rotor assembly of the induction motor includes a shaft having a bore that contains a pipe. The space between the bore and the pipe forms an annular passage which feeds a chamber located within the rotor of the induction motor. The outer portion of the rotor shaft is formed with radially extending ribs forming annular chambers that are connected with the pipe and with the annular passage. Cooling medium for the machine is circulated in contact with the exterior of the stator core through two sets of passages which are respectively connected with an inlet and an outlet and which are connected by a cross passage. The two passages extend circumferentially entirely about the stator core and cooling medium flows in opposite direction through the passages.

---

This invention relates to a cooling arrangement for a dynamoelectric machine and more particularly to a cooling arrangement wherein a fluid medium such as oil is used to cool both the rotor and the stator of the machine.

One of the objects of this invention is to provide a cooling arrangement for the rotor of a dynamoelectric machine wherein concentric passages are used to supply a cooling medium to the interior of the rotor and wherein the cooling medium is thrown outwardly by a rotating baffle means.

Another object of this invention is to provide a cooling arangement for a dynamoelectric machine wherein a cooling medium such as oil is circulated in contact with a frame of the dynamoelectric machine that carries a stator assembly.

Another object of this invention is to provide a cooling arrangement for a dynamoelectric machine that is arranged to cool the stator assembly of the dynamoelectric machine and wherein the stator assembly includes cooling passages that direct a flow of cooling medium in opposite directions through the stator assembly.

A further object of this invention is to provide a cooling arrangement for a cylindrical stator assembly wherein the stator assembly is provided with passage means arranged such that pairs of circumferentially extending cooling paths are provided on each half of the stator assembly which direct the cooling medium in opposite directions through each half of the stator assembly.

Further objects and advantages of the present invention will be apparent from the following description, reference being had to the accompanying drawings wherein a preferred embodiment of the present invention is clearly shown.

In the drawings:

FIGURE 2 is an end view of a frame and stator assembly that forms a component part of the dynamoelectric machine shown in FIGURE 1.

FIGURE 4 is a sectional view taken along line 4—4 of FIGURE 2.

FIGURE 6 is an enlarged sectional view of a portion of the dynamoelectric machine shown in FIGURE 1 and illustrating the inlet and outlet chambers for the circulation of cooling medium.

FIGURE 7 is a sectional view taken along line 7—7 of FIGURE 6.

FIGURE 8 is a sectional view taken along line 8—8 of FIGURE 6.

Figure 1:
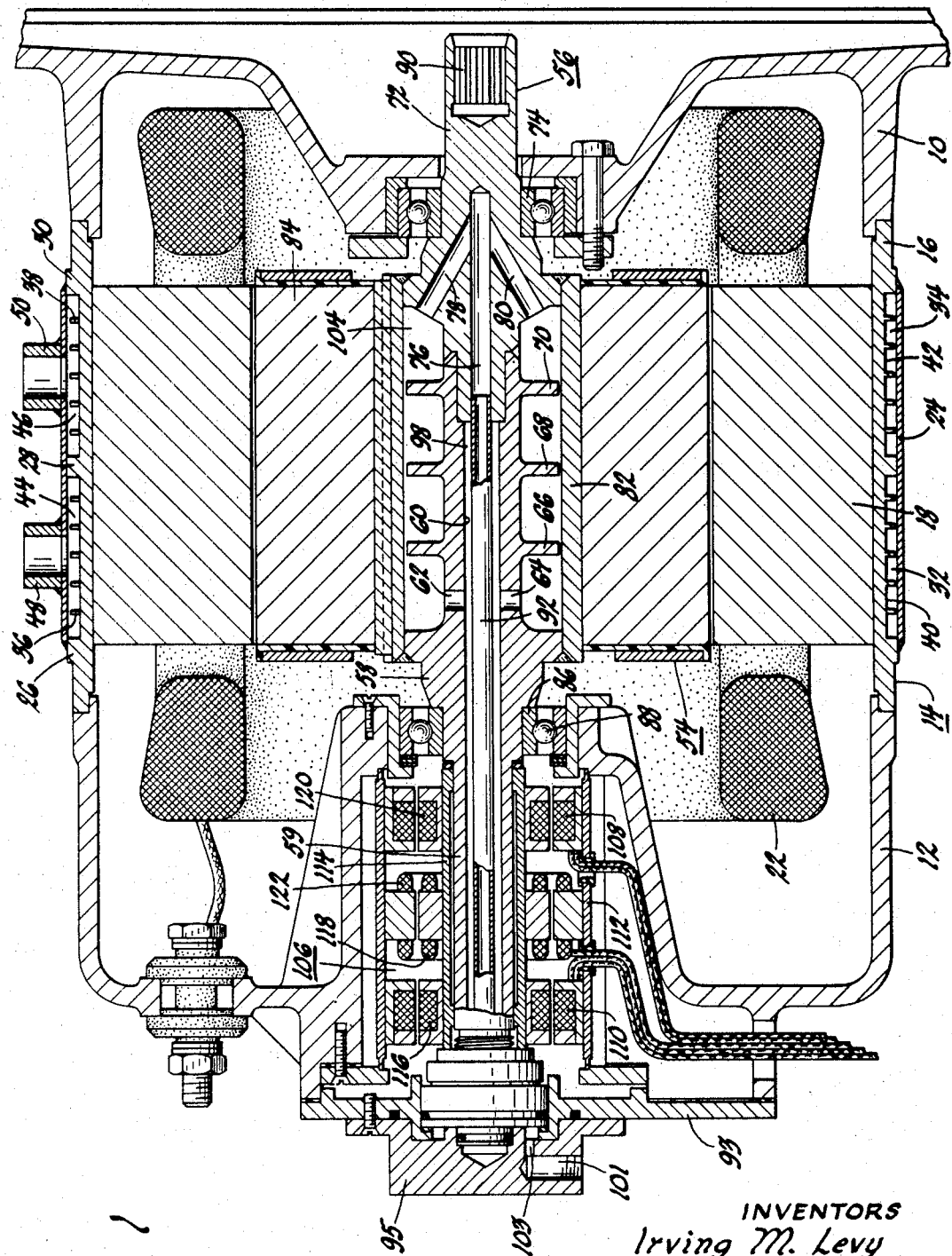
FIGURE 1 is a sectional view of a dynamoelectric machine which utilizes the cooling system of this invention.

Referring now to the drawings and more particularly to FIGURE 1, the reference numerals 10 and 12 designate end frames of a dynamoelectric machine which for purposes of illustration is shown as an induction motor. The end frames 10 and 12 support a stator assembly generally designated by reference numeral 14. The stator assembly 14 includes an annular frame 16 which is clamped between the end frames 10 and 12. The end frames and stator assembly are held together by suitably arranged bolts (not illustrated).

Figure 3:
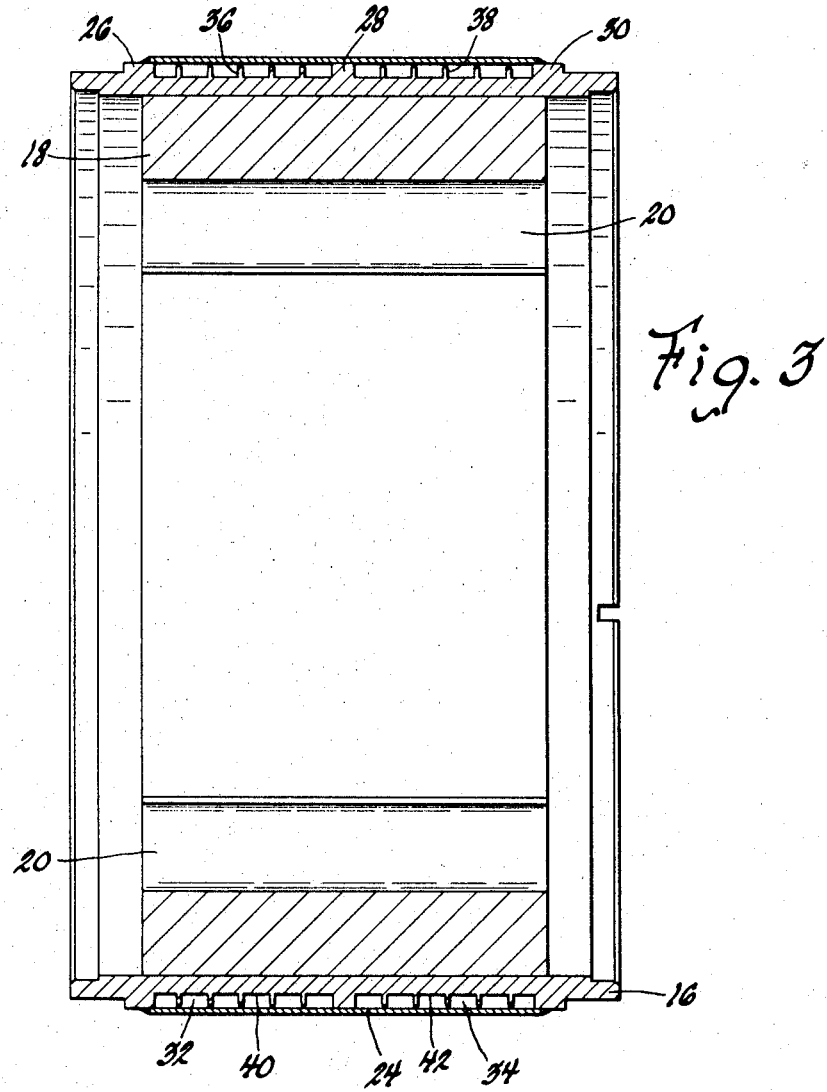
FIGURE 3 is a sectional view taken along line 3—3 of FIGURE 2.

Referring now to FIGURES 2 and 3, it is seen that the annular frame 16 supports a stack of stator laminations 18 having a plurality of circumferentially spaced slots 20 which support a stator winding 22.

A metal sleeve designated by reference numeral 24 is press-fitted to the outer periphery of the frame 16 and this sleeve is welded to the frame 16. The sleeve engages annular wall sections 26, 28 and 30 of the frame 16 to define annular chambers 32 and 34. The frame 16 has annular ridges 36 and 38 which project respectively into the chambers 32 and 34 and which define annular grooves 40 in chamber 32 and annular grooves 42 in chamber 34.

Referring now more particularly to FIGURE 1, it is seen that the frame 16 is provided with a pair of axially extending grooves 44 and 46 which cut axially across the ridges 36 and 38 and separate the ends of the ridges along the length of the grooves. The groove 44 is open to the chamber 32 and the grooves 40. The groove 44 is open to the chamber 34 and circumferentially extending grooves 42. The chamber 32 is connected with an inlet pipe 48 while the chamber 34 is connected with an outlet pipe 50.

The frame 16 is provided with another axially extending groove 52 shown in FIGURE 4 which connects chambers 32 and 34 and which cuts across the ridges 36 and 38. The ends of the groove 52 are defined by wall sections 26 and 30.

The pipe 48 is preferably the inlet and is connected with a source of cooling medium such as oil although if desired, the pipe 48 can form the outlet for the machine. Thus, the outlet side of a suitable pump can be connected with inlet pipe 48 and the inlet of the pump is connected with outlet pipe 50. The fluid cooling circuit can include the pump and a heat exchanger if so desired. The cooling medium can be circulated in either direction through the machine and, if desired, pipe 50 can be the inlet and pipe 48 the outlet.

Figure 5:
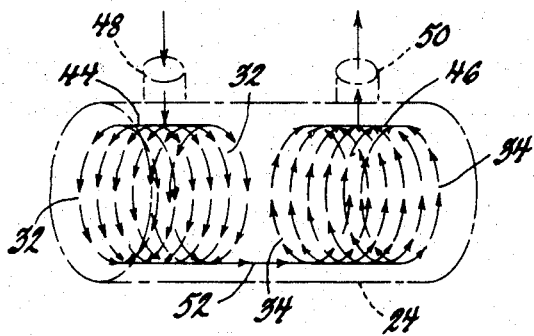
FIGURE 5 is a diagrammatic illustration of the flow of cooling medium in the dynamoelectric machine shown in FIGURE 1 for cooling the stator assembly.

It will be apreciated that the cooling medium that is supplied to pipe 48 will be supplied under pressure to the axially extending groove 44. The cooling medium will then flow in oposite directions through the annular chamber 32 as is depicted in FIGURE 5. The cooling medium that is supplied to axially extending groove or passage 44 will split such that half of it will flow counter-clock-wise in chamber 32 and the other half will flow clock-wise in chamber 32 through an opposite half of the chamber. The cooling medium will unite in axially extending passage 52 (see FIGURE 5) and then will flow through opposite halves of chamber 34 to the axially extending passage 46. The flow of cooling medium is clock-wise in FIGURE 5 for one-half of chamber 34 and is counter-clockwise in FIGURE 5 for the other half of chamber 34. It also will be apreciated that cooling medium flowing in chambers 32 and 34 is moving in opposite directions in adjacent chambers with respect to a given half of the stator assembly.

The induction motor shown in FIGURE 1 has a rotor which is generally designated by reference numeral 54. This rotor includes a shaft assembly generally designated by reference numeral 56. The shaft assembly includes a part 58 having a bore 60 connected with radially extending passages 62 and 64. The part 58 also has a plurality of annular ribs 66, 68 and 70.

The shaft assembly 56 includes a part designated by reference numeral 72 which is welded or otherwise secured to the part 58. The part 72 has a section engaging the inner race of the ball bearing 74 and has a central passage 76 connected with passages 78 and 80.

An annular sleeve 82 is welded or otherwise secured to parts 58 and 72 and has an inner wall which is spaced slightly from the circumferentially extending ends of the ribs 66, 68 and 70.

The sleeve 82 is keyed to a squirrel cage rotor part 84 having an outer wall forming an air gap with the laminations 18.

The part 58 has a section that engages the inner race 86 of a ball bearing 88. The rotor 54 is therefore journalled in ball bearings 74 and 88 and output power can be taken from the rotor by mechanical connection to a splined section 90 of the rotor.

A pipe 92 is disposed within the bore 60 of the rotor. One end of this pipe fits into the passage 76 while the opposite end of the pipe is supported by an end cap 94 which is secured to one end of the part 58. The pipe 92 connects chamber 96 formed in an end cap 95 with the passage 76 as will be appreciated from an inspection of FIGURE 1. The chamber 96 is connected with a cross passage 97 which serves as the cooling medium inlet for the machine. The end cap 95 is supported by a frame 93 supported by end frame 12.

The annular space 98 defined by the bore 60 and the outer wall of tube 92 connects the radially extending passages 62 and 64 with a chamber 100. The chambers 96 and 100 are suitably sealed from each other by the seals shown in FIGURE 6. The chamber 100 is connected with an outlet passage 101 by passage 103. The chamber 100 is connected to passage 98 by passages 105 formed in shaft part 58. Thus, the chamber 96 will be connected with the outlet side of a pump which is not illustrated and the chamber 100 will be connected with the inlet side of the pump. This pump will be used to circulate a cooling medium such as oil and the fluid circuit as with the case of the stator assembly can include a heat exchanger for the oil.

The cooling medium after leaving the pressurized side of the pump is supplied to chamber 96 and it then flows through the pipe 92. The cooling medium then flows axially through passage 76 and then through passages 78 and 80 into a chamber 104. When the rotor is rotating, the cooling medium is thrown outwardly against the inner wall of the annular part 82 and flows progressively around the outer ends of the radially extending sections 66, 68 and 70 toward passages 62 and 64. The passages 62 and 64 exhaust into the annular passage 98 which leads the cooling medium to the exhaust chamber 100 and exhaust passage 101.

Although preferably cooling medium is pumped from the chamber 96 toward chamber 100, the direction of flow can be reversed if desired so that cooling medium is pumped from chamber 100 toward chamber 96. In other words, the cooling medium can be pumped in either direction through the cooling path of the rotor.

The dynamoelectric machine shown in FIGURE 1 includes a signal generating device that is generally designated by reference numeral 106. The signal generating device is of the type shown in copending patent applications Ser. No. 295,954, filed on July 18, 1963, now Patent 3,323,032, and Ser. No. 457,329, filed on May 20, 1965, both of which are assigned to the assignee of this invention and is useful in systems of the type disclosed in these applications. This signal generating device includes annular windings 108 and 110 which are fixed to an annular support 112. The signal generating device further includes a sleeve 114 which is secured to the outer wall of the axially extending section 59 of shaft part 58. The sleeve 114 supports windings 116, 118 and 120. The winding 118 is a two-phase winding with each phase being respectively connected with windings 116 and 120. The winding 118 is positioned adjacent a fixed output winding 122 which takes the form of a plurality of output coils.

The dynamoelectric machine which is cooled by the cooling system of this invention of course can be used without the signal generating device 106 and it can be eliminated where systems of the type shown in the above mentioned copending applications are not used to energize the machine.

The cooling system of this invention operates to effectively cool both the rotor and stator of the induction motor.

In regard to rotor cooling, it will be appreciated that cooling is achieved by causing the cooling medium to contact the inner surface of part 82 and that efficient cooling is provided for the rotor by causing the oil to be thrown against the inner wall of part 82 and progressively over the ribs 66, 68 and 70.

The stator is cooled by the fluid medium contacting the frame 16 and this cooling effect is enhanced by causing the fluid medium to flow in opposite directions in opposite halves of frame 16.

While the embodiments of the present invention as herein disclosed constitute a preferred form, it is to be understood that other forms might be adopted.

What is claimed is as follows:

1. A rotor for a dynamoelectric machine comprising, a shaft having a bore, said shaft having a plurality of axially spaced and circumferentially extending walls, a cylindrical member secured to said shaft having an inner wall located closely adjacent an outer wall of said circumferentially extending sections of said shaft, said circumferentially extending sections and said cylindrical part forming a plurality of axially spaced chambers connected by the space between said cylindrical member and said circumferentially extending walls, a pipe disposed within said bore, an annular passage defined by an outer wall of said pipe and said bore, means connecting said annular passage with one of said chambers, means connecting said pipe with one of the other chambers, and rotor means carried by said cylindrical part.

2. A cooling arrangement for cooling a rotor for an induction motor comprising, a rotor, a shaft supporting said rotor, said shaft having a section disposed within said rotor which includes a cylindrical member having an inner wall and an outer wall that engages said rotor, said last-named section of said shaft having a plurality of axially spaced and circumferentially extending chambers defined by the inner wall of said cylindrical member and a plurality of walls extending radially toward said inner wall, said chambers being connected by the space between the outer edge of said radially extending walls and said inner wall of said cylindrical member, said shaft having a bore connected with one of said chambers, a pipe disposed within said bore connected with one of said other chambers, said pipe and bore being adapted to be connected with a source of cooling medium.

3. A rotor for an induction motor comprising, a shaft, said shaft having an internal bore, a tubular member secured to said shaft, said tubular member and said shaft defining an annular area which is divided into a plurality of axially spaced annular chambers by axially spaced walls extending radially of said shaft member and toward the inner wall of said tubular member, said chambers being connected by the space between an outer edge of said radially extending walls and the inner wall of said tubular member, a pipe disposed within said bore, an annular axially extending passage defined by the outer wall of said pipe and said bore, means connecting said pipe with one of said chambers located at one end of said annular area, and means connecting said chamber at the opposite end of said annular area with said annular passage, said pipe and annular passage being adapted to be connected with a source of cooling medium.

4. A cooling arrangement for the stator assembly of the dynamoelectric machine comprising, a tubular frame, a stator core supported by said tubular frame carrying a winding, said tubular frame being recessed over predetermined axially spaced areas to provide first and second axially spaced and circumferentially extending passages, a tubular sleeve secured to said frame forming an outer wall for said first and second passages, an inlet connected with one of said passages, an outlet connected with the other of said passages, and an axially extending groove circumferentially spaced from said inlet and outlet connecting said first and second passages.

5. A cooling arrangement for a dynamoelectric comprising, first and second end frames for said dynamoelectric machine, a rotor rotatably supported by said end frames, a tubular frame located between said end frames, said tubular frame supporting a stator core having a predetermined air gap with said rotor, a coil winding supported by said core, a tubular sleeve connected with said tubular frame, said tubular frame being recessed to provide first and second axially spaced and circumferentially extending passages that are defined by recesses formed in said frame and said tubular sleeve, an inlet connected with said first passage, an outlet connected with said second passage, and a groove circumferentially spaced from said inlet and outlet connecting said first and second passages, said inlet and outlet passages being adapted to be connected with a source of cooling medium.

6. A cooling arrangement for cooling the rotor of a dynamoelectric machine comprising, a rotatable shaft having a bore, a pipe disposed within said bore, the outer wall of said pipe and the inner wall of said bore forming an annular passage, a chamber connected with one end of said annular passage, a rotor part secured to said shaft and rotatable therewith, a plurality of axially spaced annular chambers defined by an outer wall of said shaft and an inner wall of said rotor part, said chambers connected by passages defined by parts of the outer wall of said shaft and the inner wall of said rotor part, means connecting one end of said pipe with one of said annular chambers and a passage connecting another of said annular chambers with said annular passage.

7. A cooling arrangement for the stator of a dynamoelectric machine comprising, a stator core having a winding, an inlet and an outlet adapted to be connected with a source of cooling medium, said inlet and outlet being disposed adjacent each other on one side of said stator core, a first passage extending circumferentially about a first axial length of stator core connected with said inlet, a second passage extending circumferentially about a second axial length of said stator core located adjacent said first passage, said second passage connected with said outlet, and a cross passage extending axially of said stator core connecting said first and second circumferentially extending passages, said cross passage located circumferentially from said inlet and outlet on an opposite side of said core whereby cooling medium supplied to said inlet flows through said first circumferentially extending passage, through said cross passage, through said second circumferentially extending passage and then through said outlet passage.

8. A cooling arrangement for an electrical device which includes a magnetic core carrying a coil winding comprising, a tubular member secured to the outer periphery of said core, said tubular member and core shaped to define first and second axially spaced cooling passages, said first cooling passage extending circumferentially entirely about a first axial length of said core, said second cooling passage extending circumferentially entirely about the remaining axial length of said core member, a cooling medium inlet connected with said first cooling passage, a cooling medium outlet connected with said second cooling passage, a cross passage extending axially of said core and connecting said first and second cooling passages, said cross passage being circumferentially spaced from said inlet and outlet, said cooling medium supplied to said inlet flowing circumferentially about said first axial length of said core through said first passage, then through said cross passage into said second passage and then circumferentially about said remaining area of said core through said second passage and then out of said core via said outlet passage.

9. A cooling arrangement for the stator assembly of a dynamoelectric machine comprising, a tubular frame, a stator core supported by said tubular frame carrying a coil winding, said tubular frame having first and second axially spaced recesses extending axially over first and second areas of said tubular frame, a tubular sleeve secured to said frame forming with said recesses first and second cooling passages which extend entirely circumferentially about said stator core, a plurality of circumferentially extending and axially spaced ribs extending from said tubular frame into said first and second cooling passages, an inlet connected with said first cooling passage, an outlet connected with said second cooling passage and an axially extending groove formed in said tubular frame and circumferentially spaced from said inlet and outlet connecting said first and second cooling passages.

References Cited

UNITED STATES PATENTS

| 2,674,404 | 4/1954 | Wieseman | 310—54 X |
| 2,706,260 | 4/1955 | Heintz | 310—54 |
| 3,060,335 | 10/1962 | Greenwald | 310—61 X |
| 3,260,872 | 7/1966 | Potter | 310—54 |
| 3,009,072 | 11/1961 | Mossay | 310—57 |

FOREIGN PATENTS 137,396  9/1952  Sweden.

MILTON O. HIRSHFIELD, *Primary Examiner.*

D. F. DUGGAN, *Assistant Examiner.*

U.S. Cl. X.R.

310—61